United States Patent
Soulios

(10) Patent No.: US 8,819,424 B2
(45) Date of Patent: Aug. 26, 2014

(54) TOKEN-BASED AUTHENTICATION USING MIDDLE TIER

(75) Inventor: Dimitrios Soulios, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 12/895,595

(22) Filed: Sep. 30, 2010

(65) Prior Publication Data

US 2012/0084561 A1 Apr. 5, 2012

(51) Int. Cl.
*H04L 9/32* (2006.01)

(52) U.S. Cl.
USPC ........... 713/168; 713/175; 713/171; 713/155; 726/9; 726/10; 726/12; 726/5; 726/20; 709/227; 709/228; 709/229

(58) Field of Classification Search
CPC . H04L 9/3213; H04L 63/0807; H04L 9/3263; H04L 63/0823; G06F 21/33
USPC ............ 713/155, 168, 171, 175; 726/2, 5–10, 726/18–20; 380/270; 709/227–229
See application file for complete search history.

(56) References Cited

U.S. PATENT DOCUMENTS

| | | | |
|---|---|---|---|
| 6,041,357 A * | 3/2000 | Kunzelman et al. .......... | 709/228 |
| 6,052,785 A | 4/2000 | Lin et al. | |
| 7,281,050 B2 | 10/2007 | Dinker et al. | |
| 7,290,288 B2 | 10/2007 | Gregg et al. | |
| 7,373,508 B1 * | 5/2008 | Meier et al. .................... | 713/168 |
| 7,698,555 B2 * | 4/2010 | Jiang et al. .................... | 713/168 |
| 7,712,137 B2 | 5/2010 | Meier | |
| 2005/0198379 A1 * | 9/2005 | Panasyuk et al. ............. | 709/239 |
| 2007/0022473 A1 | 1/2007 | Hird | |
| 2009/0007217 A1 * | 1/2009 | Birger et al. ..................... | 726/1 |
| 2010/0199089 A1 * | 8/2010 | Vysogorets et al. .......... | 713/168 |

OTHER PUBLICATIONS

Microsoft SQL Server 2000 Authentication Mechanisms, Pub. Date Oct. 20, 2005 (13 pages).
How to: Connect to SQL Server Using Windows Authentication in ASP.NET 2.0, Pub. Date Jul. 2005 (7 pages).
Popular Websites Vulnerable to Cross-Site Request Forgery Attacks, Pub. Date: Sep. 29, 2008 (7 pages).

* cited by examiner

*Primary Examiner* — Venkat Perungavoor
*Assistant Examiner* — Amir Mehrmanesh
(74) *Attorney, Agent, or Firm* — Nicholas Chen; Sade Fashokun; Micky Minhas

(57) ABSTRACT

An intermediary system that facilitates a connection request from a client to a server. The intermediary system may participate in either or both of a token creation phase and a server connection phase. If participating in the token creation phase, the intermediary system generates a token that may later be used by the client during a server connection phase. The token includes a session identifier and is returned to the client. If participating in the server connection phase, the intermediary receives the token, extracts the session identifier from the token, and compares against the session identifier for the session in which the token was created. If the session identifiers match, then the intermediary connects to the server to complete the connection request.

18 Claims, 6 Drawing Sheets

TOKEN-BASED AUTHENTICATION USING MIDDLE TIER

BACKGROUND

Computer services are now often offered over a network such as the Internet. In order to securely provide such services, it is often necessary to accurately authenticate those computing systems or users who are requesting accesses to the computing service. In other words, the service requestor's identity is confirmed. Authentication has been important for millennia and thus various authentication mechanisms have been developed. Authentication is now quite prolific in Internet-based transactions. Authentication precedes authorization, in which the permissions associated with the authenticated identity are verified.

There have also been attempts to circumvent the security provided by authentication. One such circumvention is referred to in the art as cross site request forgery, in which a third party site tries to take advantage of secure information provided between an authenticated party and an authenticating party in order to impersonate the authenticated party. Authentication methods that reduce the opportunity for cross site request forgery would be highly valuable.

BRIEF SUMMARY

At least one embodiment described herein relates to an environment in which a client requests a service from a server. An intermediary system intervenes between the client and server, and is configured to perform facilitate the server request.

In some embodiments, the intermediary system performs a token creation phase in which intermediary generates a token for the client, that may later be used by the client during a server connection phase. In the token creation phase, the intermediary receives a connection request from a client, the request including one or more connection credentials. The intermediary uses at least one of the credentials to attempt a connection to the server. The intermediary creates a session identifier and formulates a connection ticket that includes the session identifier and the credential(s) used in the successful server connection attempt. The connection ticket is then encrypted, and included in a token, which is then returned to the client.

In some embodiments, the intermediary system performs a server connection phase. In the server connection phase, the intermediary receives the token, decrypts the token using a secret key to thereby extract a connection ticket. Then, a session identifier is extracted from the connection ticket. This extracted session identifier is then compared against a session identifier in which the connection ticket was formulated. If the session identifiers match, the extracted credentials are then used to complete a connection with the server.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, an intermediary system facilitates a connection request from a client to a server. The intermediary system may participate in either or both of a token creation phase and a server connection phase. If participating in the token creation phase, the intermediary system generates a token that may later be used by the client during a server connection phase. The token includes a session identifier and is returned to the client. If participating in the server connection phase, the intermediary receives the token, extracts the session identifier from the token, and compares against the session identifier for the session in which the token was created. If the session identifiers match, then the intermediary connects to the server to complete the connection request. First, some introductory discussion regarding computing systems will be described with respect to FIG. 1. Then, the embodiments of the intermediation of server requests will be described with respect to FIGS. 2 through 6.

Figure 1:
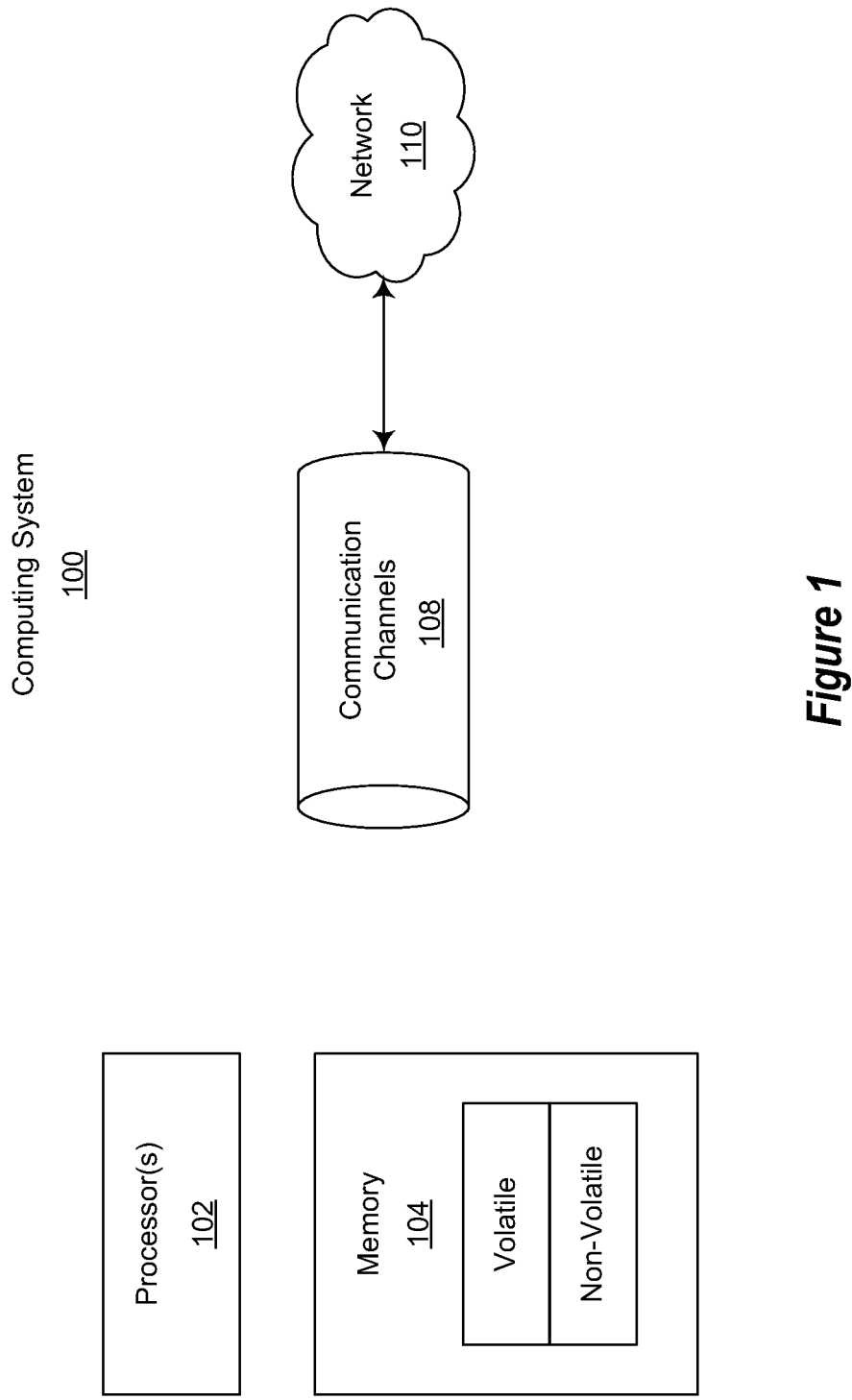
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
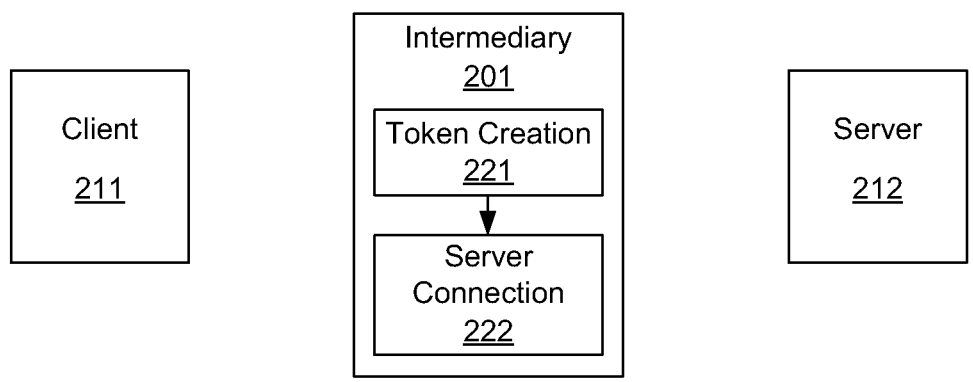
FIG. 2 illustrates an environment that in which the principles described herein may operate in which an intermediary performs one or both of a token creation phase and a server connection phase to facilitate server requests from the client to the server.

FIG. 2 illustrates an environment 200 that in which the principles described herein may operate. The environment 200 includes a client computing system 211, a server computing system 212 and an intermediary system 201. Each of the computing systems 211, 212 and 201 may be structured as described above for the computing system 100 of FIG. 1. Furthermore, any one or more or even all of the computing systems 211, 212 and 201 may be combined into a single computing system. For instance, the intermediary system 201 may be operable on the server computing system 212.

The client computing system 211 is modified with the term "client" and the server computing system 212 is modified with the term "server" since, as described below, the client computing system 211 makes a service request to the server computing system 212. In other contexts, the client computing system 211 may provide services, and the server computing system 212 may consume services. The client computing system 211, the server computing system 212, and the intermediary 201 may also be referred to herein as "client", "server", and "intermediary", for short.

The intermediary 201 facilitates a service request from the client 211 to the server 212. The service request may be made in two phases: a token creation phase 221 and a subsequent server connection phase 222. The intermediary 201 may participate in just one or perhaps both of these phases. The benefits of splitting the request into two phases will be outlined after the description of FIGS. 3 through 6.

Figure 3:
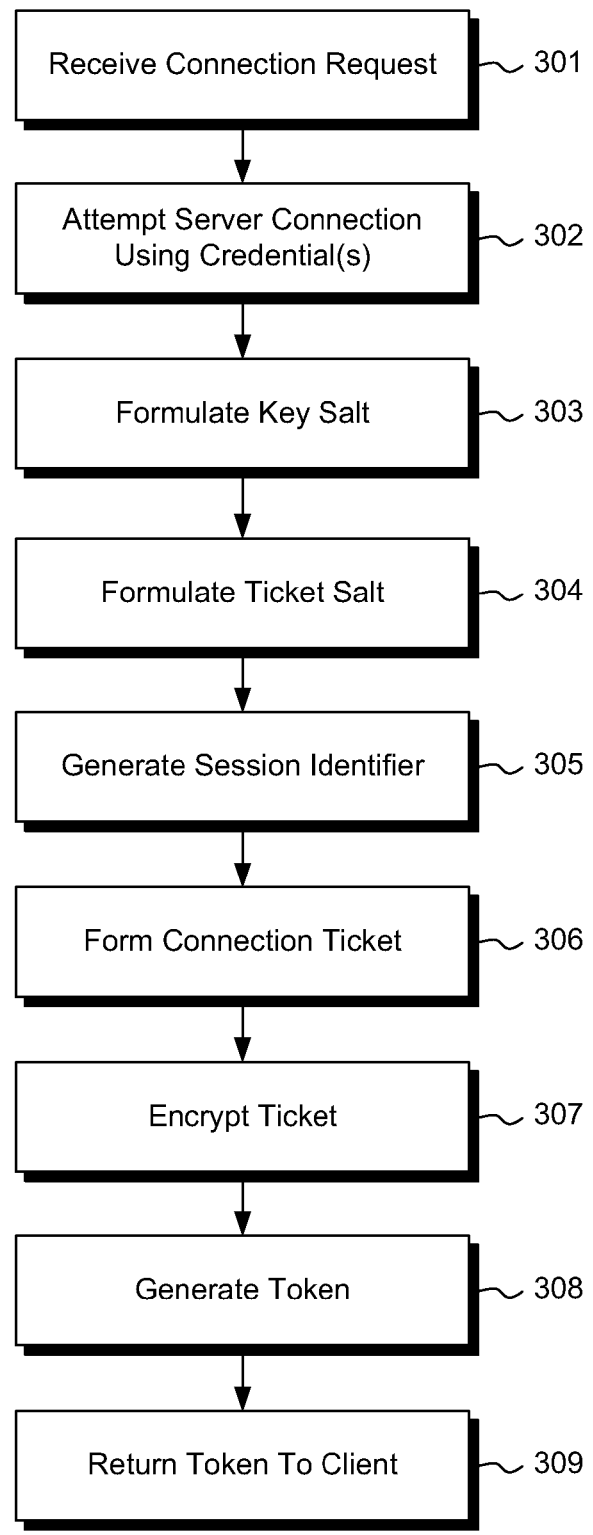
FIG. 3 illustrates a flowchart of a method for performing the token creation phase.
Figure 5:
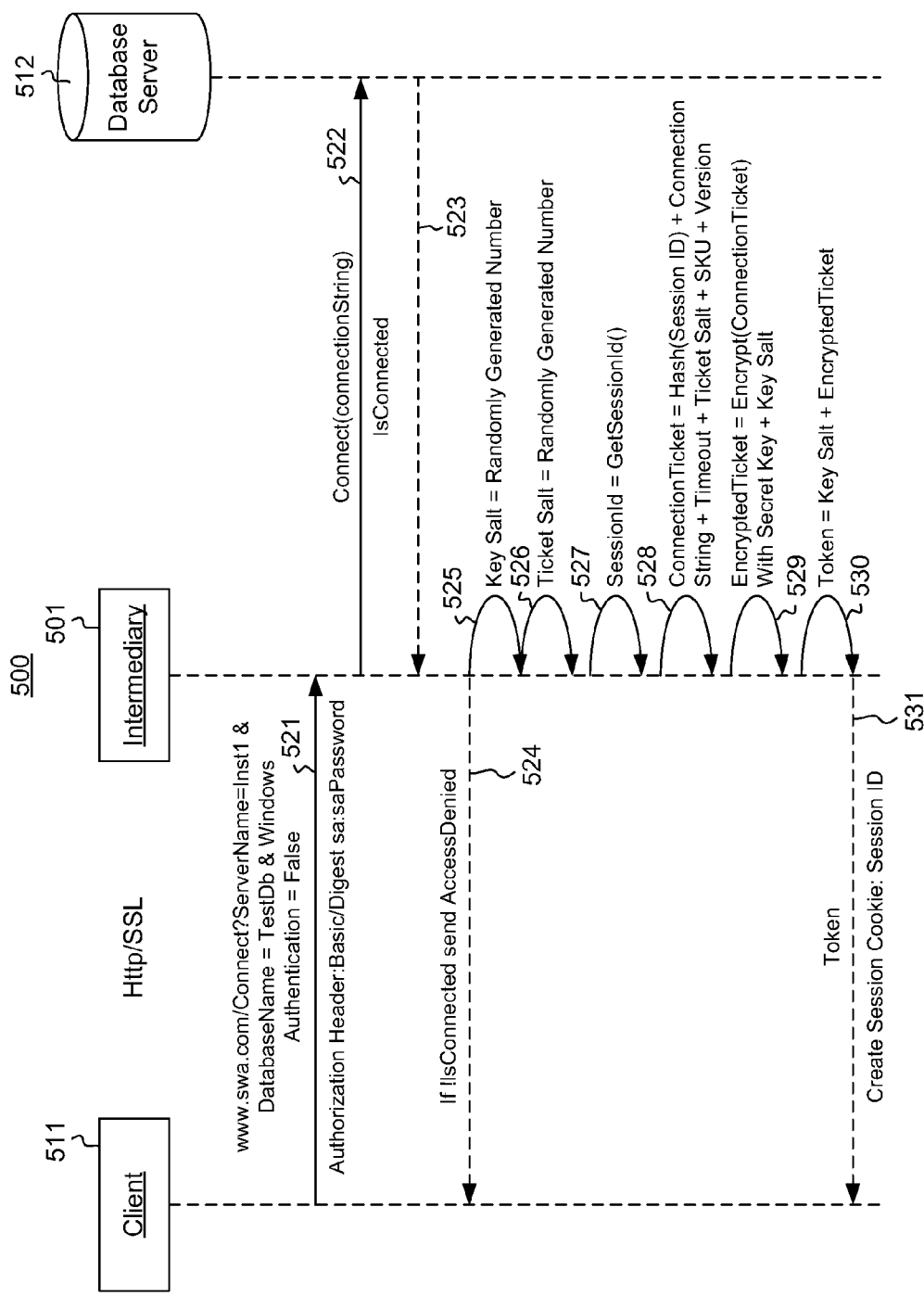
FIG. 5 shows a more specific sequence diagram in a specific example in which a client is making a request to a database server as part of a token creation phase.

FIG. 3 illustrates a flowchart of a method 300 for performing the token creation phase. In some embodiments, the intermediary 201 of FIG. 2 may participate in the token creation phase as symbolically represented by the token creation element 221 being included within the intermediary 201. FIG. 5 shows a more specific sequence diagram 500 in a specific example in which a client is making a request to a database server, and in which various optional actions are also illustrated. Accordingly, FIG. 5 will be frequently referred to as a very specific example of the method 300 of FIG. 3.

Referring to the method 300 of FIG. 3, in the token creation phase, the intermediary receives a connection request for a client (act 301). Referring to the specific example of FIG. 5, the client 511 communicates a connection request 521 to the intermediary 501. In the example, the client 511 and the intermediary 501 communicate using the Secure Sockets Layer in the HyperText Transport protocol. The connection request includes one or more credentials. For instance, in FIG. 5, a username and password are provided in the authorization header. In addition, a server name and instance identifier may be provided as a Uniform Resource Locator (URL) parameter. In particular, the URL specifies the address of the server that is to be connected to. The server name that is included as a URL parameter defines the server name that the client is to connect to. In the case that the server is a database server, the instance identifier that is included as a URL parameter defines a database name that the client is to connect to. Separate communications may be used to perform the connection request, and to provide one or more credentials, in which case the multiple communications may be considered as a request that includes the credentials consistent with the principles described herein.

Referring to FIG. 3, the intermediary uses at least one of the one or more connection credentials to attempt a connection to a server (act 302). In FIG. 5, for example, the intermediary 501 formulates a connection string that includes the provided credentials including the user name and password. The intermediary 501 then uses formulates a connect method with the connection string as a parameter. This would be an appropriate for a SQL server, but other methods of connection attempts may be used for other types of servers. The connection attempt is performed in order to verify that the credentials are part of a valid connection with the server. In FIG. 5, the connection attempt is represented by arrow 522. The result of the connection attempt is represented by arrow 523. If the connection fails, the method 300 terminates after perhaps notifying the user of the failure (represented by arrow 524). If the connection succeeds, the method 300 continues.

Referring again to FIG. 3, the intermediary optionally formulates key salt (act 303) and formulates ticket salt (act 304). "Salt" is short for a pseudo-random sequence. In FIG. 5, the formulation of the key salt is represented by arrow 525, and the formulation of the ticket salt is represented by arrow 526.

The key salt is to randomize the secret key used to later encrypt and decrypt. This makes a brute force attack to discover the secret key much more difficult. The ticket salt is used to randomize the connection ticket to be encrypted. The use of the key salt and the ticket salt provide security to the method 300. Furthermore, the salt makes it more certain that a unique token will be generated whenever a token is created. The generation of the salt is optional. If the salt is used, a reasonable time for the salt to be generated would be upon receipt of the token creation request. However, the timing of generation is not key to the broadest aspects described herein, so long as the salt is generated prior to it being used.

In FIG. 3, the intermediary formulates a session identifier associated with the connection request (act 305). This session identifier will be included within the connection ticket as described below. However, the timing of the creation of the session identifier is not critical so long as the session identifier is available when the connection ticket is being formed. Nevertheless, in many protocols, the session identifier is generated upon a client connecting with any server. Accordingly, in implementations in which the intermediary uses those protocols to communicate with the client, the session identifier may automatically be generated as part of the protocol. In FIG. 5, the session identifier is obtained by calling a specific method to create the session identifier, as represented by arrow 527.

The connection ticket is them formed (act 306). The connection ticket includes the session identifier. In this description and in the claims, a first data item "includes" a second data item if the second data item may be obtained from information within the first data item. For instance, the second data item may be encrypted, compressed, hashed, or otherwise be in a form that is not directly readable without a converse transformation being performed on the second data item. Furthermore, the first data item may just contain a pointer or reference that may be used to access the second data item.

The connection ticket includes the session identifier and at least one of the connection credentials. In FIG. 5, for example, the formulation of the connection ticket is represented by arrow 528. In this specific example, the connection ticket includes a concatenation of a hash of the session identifier, the connection string used to successfully attempt the connection to the server, a timeout, the ticket salt, a SKU (i.e., a server identifier), and a version. Such a connection ticket allows the token to be provided to different intermediaries that perform the same function as described for the intermediary 201, since no state is required for the intermediary in the transition from the token creation phase to the server connection phase. Thus, intermediary 201 may be but one of a potentially large number of intermediaries assisting in the token creation phase and/or server connection phase between a large number of clients and/or a larger number of servers. So long as those different intermediaries share the same secret key, they will be able to facilitate the server connection phase described below. This allows the system to scale since communication is not required between intermediaries to maintain state from one intermediary to another.

Examining the contents of the connection ticket, to include the session identifier, the session identifier is first hashed before being included in the connection ticket. The timeout is used to determine if the token is still valid when the token is later provided in the subsequent server connection phase. The ticket salt is used to randomize the connection ticket so as to significantly inhibit the chance that identical tokens will be generated. The connection ticket also may include server specific information such as the SKU (i.e., the server identifier), and the version of the server.

The connection ticket is then encrypted (act 307). This is performed using a secret key that is unknown to the client. In FIG. 5, this encryption is represented by arrow 529. In the specific example of FIG. 5, the connection ticket is encrypted using a combination of the secret key and the key salt. Specifically, the combination used for encryption is obtained by logically XOR'ing the secret key and the key salt.

The token is then generated (act 308) that includes the connection ticket. In FIG. 5, the connection ticket is represented by arrow 530 and includes a concatenation of the key salt and the encrypted connection ticket. The token is then provided to the client (act 309). In FIG. 5, the token is returned in a cookie along with a session identifier as cookies may include a session identifier that identifies a session in which the cookie was generated. However, different mechanisms may be used to return the token depending on the connection. The return of the cookie that includes the token and session identifier is represented in FIG. 5 using the arrow 531.

FIG. 3 may be performed for multiple connection requests by any given client. Thus, a client can create and keep on reserve multiple connection tokens for various connections. The client can then use multiple tokens in one application in order to authenticate and fetch data from different database servers using the same intermediary.

Figure 4:
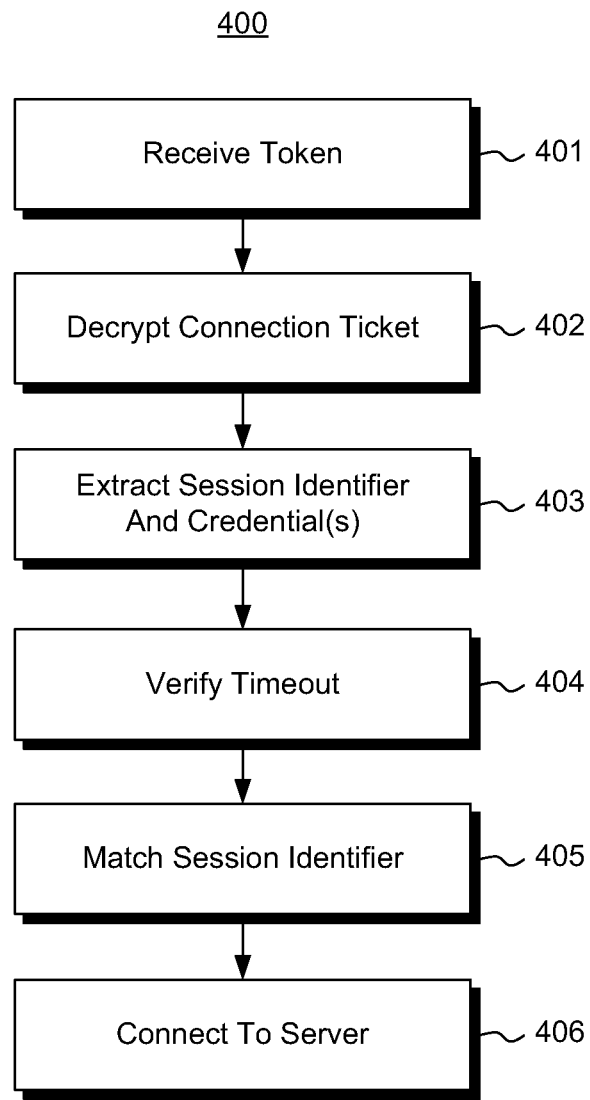
FIG. 4 illustrates a flowchart of a method for performing the server connection phase.
Figure 6:
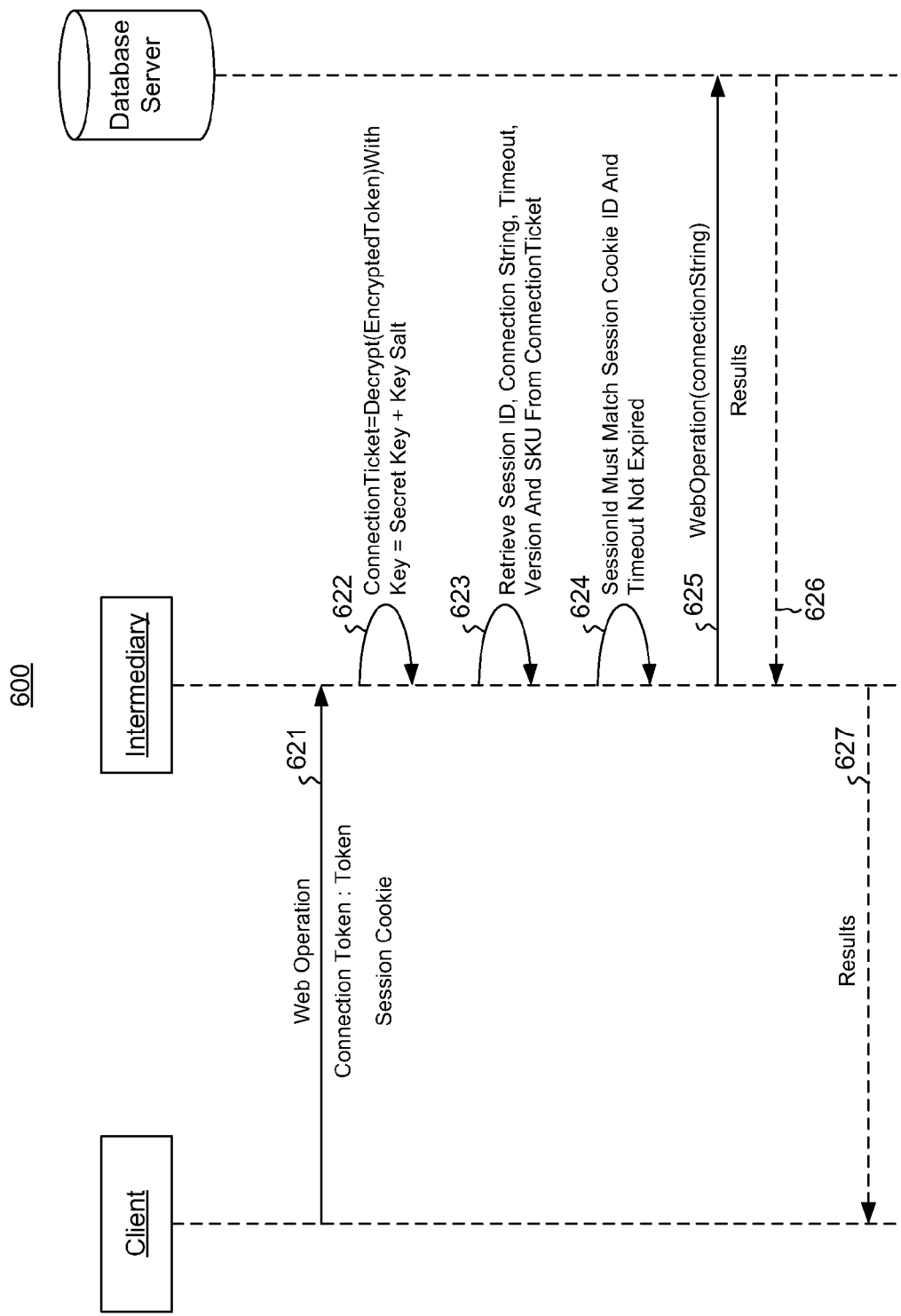
FIG. 6 shows a more specific sequence diagram in a specific example in which a client is making a request to a database server as part of a server connection phase.

As previously mentioned, the server request is facilitated by first performing a token creation phase, and then performing a server connection phase. FIG. 4 illustrates a flowchart of a method 400 for performing the server connection phase. In some embodiments, the intermediary 201 of FIG. 2 may participate in the server connection phase as symbolically represented by the token creation element 222 being included within the intermediary 201. FIG. 6 shows a more specific sequence diagram 600 in a specific example in which a client is making a request to a database server, and in which various optional actions are also illustrated. Accordingly, FIG. 6 will be frequently referred to as a very specific example of the method 400 of FIG. 4.

The method 400 is initiated upon receiving a token from the client (act 401). For instance, this token may be the token that was created using the method 300 of FIG. 3. The token is attached with a service request from the client to be performed on the server. In FIG. 6, for example, the intermediary receives a web operation request (as represented by arrow 621) along with a cookie that is returned to the intermediary. Recall that in the sequence diagram 500 of FIG. 5, this may be the same cookie that was sent to the client along with the token. In FIG. 6, the communication between the client and intermediary may be over a non-secure network because the connection ticket is already encrypted allowing its distribution without exposing its sensitive encrypted contents. This can improve performance because the setting up of security over a secure network (e.g., creating a secure socket layer) is expensive in terms of processing time, latency, and memory usage.

The intermediary then decrypts the token using the secret key to extract the connection ticket (act 402). In FIG. 6, for example, the token includes a concatenation of the key salt and the encrypted connection token. The encrypted connection token was encrypted using a combination of the secret key and the key salt, the combination being generated by logically XOR'ing the secret key and the key salt. The combination may be regenerated by reading the key salt from the token, logically XOR'ing the key salt with the secret key, and decrypting the connection ticket. This is represented in FIG. 6 by arrow 622, resulting in the connection ticket.

The session identifier and the at least one connection ticket are then extracted from the connection ticket (act 403). In FIG. 6, this is represented by arrow 623, in which the hashed session identifier is obtained, along with the connection string that contains the credential(s) used in the previous successful connection attempt from the token creation phase. Furthermore, a timeout, the SKU (i.e., the server identifier), and the version are then extracted.

A few checks are then performed to provide security. If the connection ticket includes a timeout, the timeout is reviewed to verify whether the timeout has expired. If the timeout has expired, then the token is determined to be invalid.

If it is verified that the timeout has not expired (act 404), then it is evaluated whether the session identifier extracted from the connection ticket matches a session identifier for a session in which the connection ticket was formulated (act 405). For instance, in FIG. 6, the verification of the timeout and the session identifier are represented by arrow 624. To verify the session identifier, the session identifier extracted from the token is compared against the session identifier included in the cookie. Rather than being included in the cookie, the session identifier can come from the network stack that can associated session data with a specific channel.

By checking that the session identifiers match (act 405), at least two protections are achieved. First, malicious sites that are loaded in the same session cannot access the intermediary because they have no access to the token. Second, even if someone gets hold of the token, the individual will not be able to access the token because he needs to be in the same session. Based on these protections, there is protection against Cross Site Request Forgery (XSRF) attacks. Furthermore, there is protection against over the shoulder attacks, in which someone can see the links in the client's address bar, but cannot steal the session.

If the timeout has not expired (act 404), and the session identifiers match (act 405), then the server request is sent to the server along with credentials (act 406). In FIG. 6, for example, the service request is forwarded with the connection string as represented by the arrow 625. The results of the service request are then returned by the server to the intermediary (as represented by the arrow 626), whereupon the results are returned from the intermediary to the client (as represented by the arrow 627).

Depending on the embodiments, the embodiment described herein may have any one or more of the following benefits. The client may connect to any server through the intermediary without the need to have a membership provider for each server. The web service interface may have a RESTful web service interface and efficiently mitigate XSRF attacks. REST is a representational state transfer is a well-known architectural pattern for web communication.

Furthermore, there is scalability in that the principles enable the interface to be used against a web farm that has a collection of intermediaries across different data centers so the server request may be routed to any of them based on load balancing or random assignment. The method may be used even when cookies are disabled by setting the token to be present in the web service URL. The server connection phase allows communication over secure and non-secure transport protocols since the connection credentials are encrypted inside the token and do not appear in plain text. The method may be performed in a server farm without the need of a session server since the method does not require anything stored on the intermediary.

Thus, a useful, flexible and secure mechanism for intermediating service requests is described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer storage media, not including transmission media, having thereon computer-executable instructions that when executed by one or more processors of a computing system cause the computing system to perform a method for acquiring a connection token, the method comprising an intermediary system performing the following:

an act of receiving, at the intermediary system, a connection request from a client to a server, the request including one or more connection credentials, formulated as one or more connection strings, used by the client to connect to the server;

at the intermediary system, an act of using at least one of the one or more connection credentials to connect to the server to verify that the connection credentials are part of a valid connection with the server;

as a result of the intermediary system connecting to the server to verify that the connection credentials are part of a valid connection with the server, an act of obtaining a session identifier generated as a result of the intermediary connecting to the server to verify that the connection credentials are part of a valid connection with the server;

an act of formulating a connection ticket that includes the session identifier and at least one of the one or more connection strings;

an act of encrypting the connection ticket using a secret key;

an act of generating a token that includes the connection ticket; and an act of providing the token that includes the connection ticket to the client.

2. The computer program product in accordance with claim 1, further comprising:

an act of formatting key salt, wherein the act of encrypting the connection ticket using a secret key comprises an act of encrypting the connection ticket using a combination of the secret key and the key salt.

3. The computer program product in accordance with claim 2, wherein the act of providing a token that includes the connection ticket to the client comprises an act of providing a token that includes the connection ticket and the key salt to the client.

4. The computer program product in accordance with claim 1, wherein the act of formulating the connection ticket that includes the session identifier and the at least one of the one or more connection strings comprising:

an act of formulating a hash of the session identifier; and
an act of including the hash of the session identifier in the connection ticket.

5. The computer program product in accordance with claim 1, wherein the act of formulating the connection ticket further comprising:

an act of including a timeout in the connection ticket.

6. The computer program product in accordance with claim 1, wherein the act of formulating the connection ticket further comprising:

an act of formulating ticket salt; and
an act of including the ticket salt in the connection token.

7. The computer program product in accordance with claim 1, wherein the act of formulating the connection ticket further comprising:

an act of including server specific information in the connection token.

8. A computer implemented method for connecting a client to a server, the method comprising:

an act of receiving a token from the client;
an act of decrypting the token using a secret key to extract a connection ticket;
an act of extracting a session identifier and at least one credential from the connection ticket;
an act of verifying that the session identifier extracted from the connection ticket matches a session identifier for a session in which the connection ticket was formulated, wherein the session identifier for the session in which the connection was formulated was obtained as a result of: an intermediary receiving a connection request from a client to a server, the request including one or more connection credentials, formulated as one or more connection strings, used by the client to connect to the server; the intermediary using at least one of the one or more connection credentials to connect to the server to verify that the connection credentials are part of a valid connection with the server; as a result of connecting to the server to verify that the connection credentials are part of a valid connection with the server, the intermediary obtaining a session identifier generated as a result of the intermediary connecting to the server to verify that the connection credentials are part of a valid connection with the server; and an act of using the extracted at least one credential to connect with the server.

9. The computer implemented method in accordance with claim 8, wherein the token includes a key salt, the act of decrypting the token comprising:

an act of decrypting the token using a combination of the secret key and the key salt.

10. The computer implemented method in accordance with claim 9, wherein the act of decrypting comprises:

an act of bit-wise XOR'ing the secret key and the key salt; and
an act of using the XOR'ed value to decrypt the token.

11. The computer implemented method in accordance with claim 8, wherein the act of verifying that the session identifier extracted from the connection ticket matches a session identifier for a session in which the connection ticket was formulated comprises:

an act of extracting a session identifier from a cookie returned by the client; and
an act of comparing the session identifier extracted from the connection ticket with the session identifier extract from the cookie.

12. The computer implemented method in accordance with claim 8, further comprising:

an act of receiving a web request from the client to be performed on the server.

13. The computer implemented method in accordance with claim 12, wherein the act of using the extracted at least one credential to connect with the server comprises:

an act of requesting that the server fulfill the web request.

14. The computer implemented method in accordance with claim 8, wherein the connection ticket includes a timeout, the method comprises:

an act of verifying that the timeout has not expired prior to the act of using the extracted at least one credential to connect to the server.

15. The computer implemented method in accordance with claim 8, wherein the connection ticket includes a ticket salt.

16. A computer network comprising:

a client computing system,
a server computing system, and
an intermediary for facilitating a web request from the client computing system to the server computing system, wherein the intermediary is configured to perform facilitate the web request using a token creation phase, and a subsequent server connection phase, wherein the token creation phase comprises:

an act of receiving, at the intermediary, a connection request from a client to a server, the request including one or more connection credentials, formulated as one or more connection strings, used by the client to connect to the server;

an act of the intermediary using at least one of the one or more connection credentials to connect to the server to verify that the connection credentials are part of a valid connection with the server;

as a result of the intermediary connecting to the server to verify that the connection credentials are part of a valid connection with the server, an act of obtaining a session identifier generated as a result of the intermediary connecting to the server to verify that the connection credentials are part of a valid connection with the server;

an act of formulating a connection ticket that includes the session identifier and the at least one of the one or more connection strings;

an act of encrypting the connection ticket using a secret key; and an act of generating a token that includes the connection ticket; and an act of providing the token that includes the connection ticket to the client, wherein the server connection phase comprises:
an act of receiving the token from the client;
an act of decrypting the token using the secret key to extract a connection ticket;
an act of extracting the session identifier and the at least one credential from the connection ticket;
an act of verifying that the session identifier extracted from the connection ticket matches a session identifier for a session in which the connection ticket was formulated; and an act of using the extracted at least one credential to connect with the server.

17. The computer network in accordance with claim 16, wherein the intermediary is configured to, during the token creation phase, do the following:

an act of formatting key salt, wherein the act of encrypting the connection ticket using a secret key comprises an act of encrypting the connection ticket using a combination of the secret key and the key salt, and wherein the act of providing a token that includes the connection ticket to the client comprises an act of providing a token that includes the connection ticket and the key salt to the client.

18. The computer network in accordance with claim 16, wherein intermediary is further configured to, during the server connection phase, perform the act of verifying by performing the following:

an act of extracting a session identifier from a cookie returned by the client; and an act of comparing the session identifier extracted from the connection ticket with the session identifier extract from the cookie.

* * * * *